United States Patent [19]

Hamed

[11] 4,421,900
[45] Dec. 20, 1983

[54] BLENDS OF NATURAL AND SYNTHETIC RUBBERS

[75] Inventor: Gary R. Hamed, Akron, Ohio

[73] Assignee: The Firestone Tire & Rubber Company, Akron, Ohio

[21] Appl. No.: 369,283

[22] Filed: Apr. 16, 1982

[51] Int. Cl.$^3$ ............... C08L 7/00; C08L 9/00; C08L 9/06; C08L 15/02

[52] U.S. Cl. ................. 525/218; 525/213; 525/215; 525/231

[58] Field of Search ............ 525/218, 201, 213, 215, 525/231

[56] References Cited

U.S. PATENT DOCUMENTS

| 3,037,963 | 6/1962 | Christenson | 260/72 |
| 3,118,852 | 1/1964 | Christenson et al. | 260/45.2 |
| 3,247,139 | 4/1966 | Christenson et al. | 260/21 |
| 3,405,200 | 10/1968 | Yasumura et al. | 525/218 |
| 3,798,190 | 3/1974 | Yoshimoto et al. | 260/5 |
| 3,832,317 | 8/1974 | Mikofalvy et al. | 260/29.6 |
| 4,254,013 | 3/1981 | Friedman et al. | 260/42.47 |

Primary Examiner—Allan Lieberman
Attorney, Agent, or Firm—Daniel N. Hall

[57] ABSTRACT

A blend of natural and synthetic rubbers having processability and improved green strength and building tack is provided. The blend comprises from about 5 to 55 parts by weight of natural rubber, from about 30 to 50 parts by weight of a conjugated diene-containing synthetic rubber and, from about 5 to 50 parts by weight of a substituted acrylamide-containing synthetic rubber. The latter synthetic rubber comprises from about 0.3 to 10 percent by weight of an N-(alkoxymethyl)acrylamide monomer, based upon the weight of the substituted acrylamide-containing rubber.

3 Claims, 2 Drawing Figures

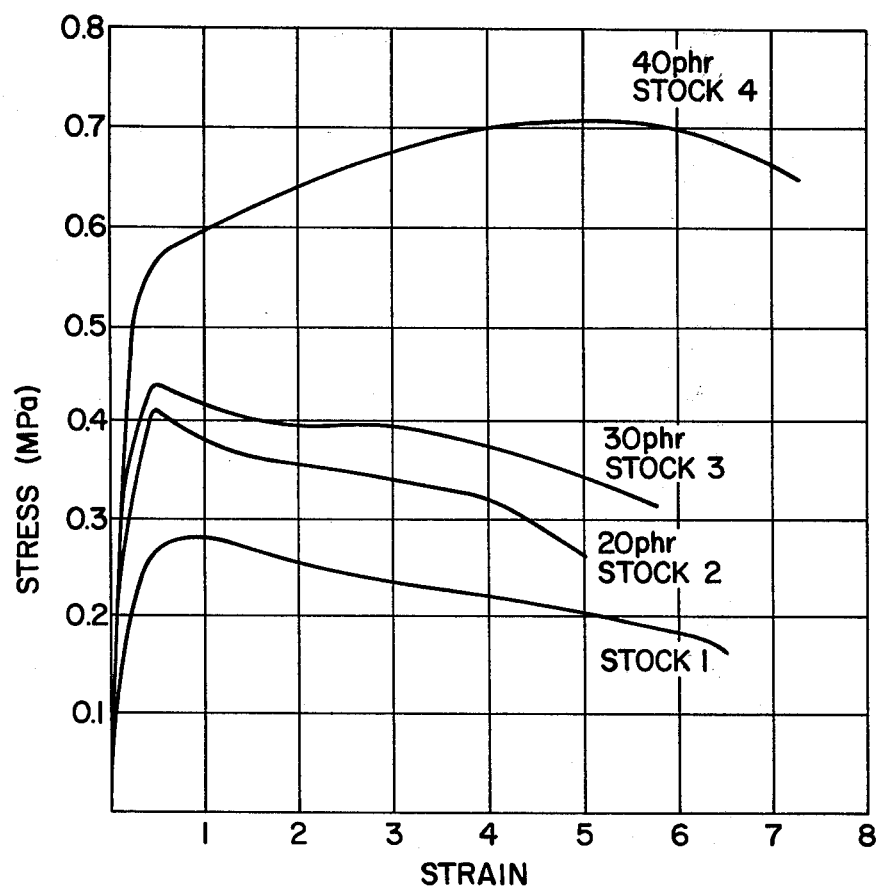

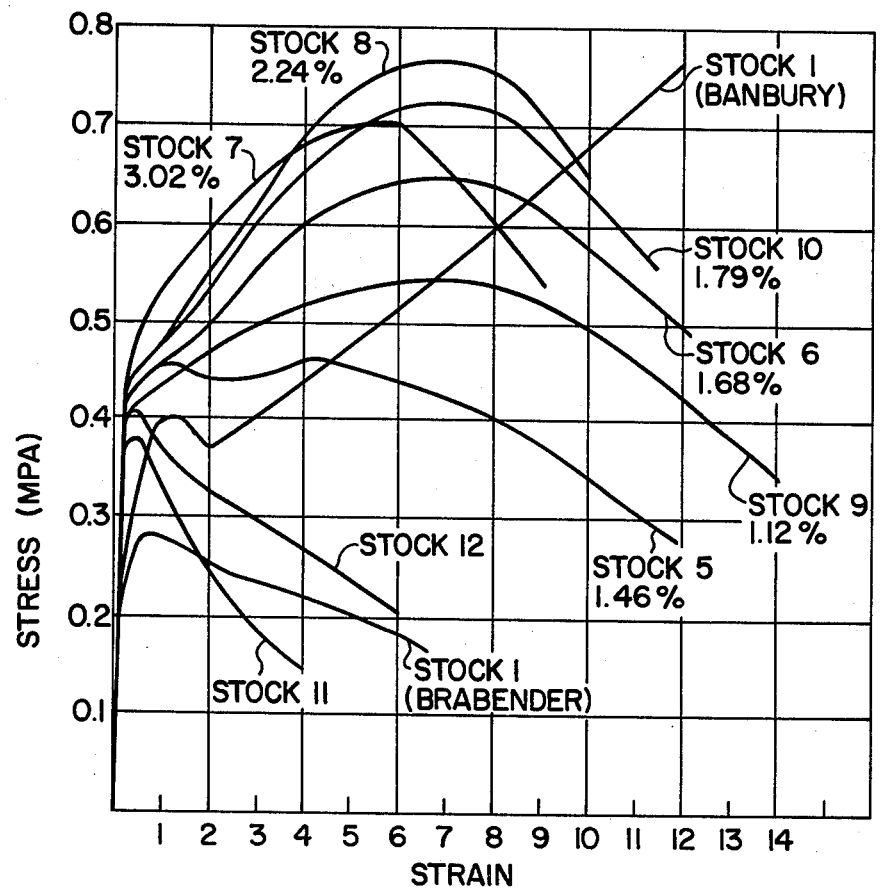

BLENDS OF NATURAL AND SYNTHETIC RUBBERS

TECHNICAL FIELD

The present invention provides for an improvement in the green strength and building tack of natural/synthetic rubber blends which is accomplished by partially substituting the natural rubber component with a modified synthetic emulsion polymer.

In the art of rubber compounding it is recognized that natural rubber is processable and imparts tack and green strength which are useful properties for the manufacture of articles such as tires. Processability, tack and green strength are important properties of many elastomers but are not usually all present in one compound. Tack is the ability of two materials to resist separation after bringing their surfaces into contact for a short time under a light pressure. The green strength of an elastomer is its resistance to deformation and fracture before vulcanization. Processability is a general term embracing processes and associated factors including mastication and mixing time, energy consumption, scorching tendencies, dispersion of fillers, extrusion and dimensional stability.

Rubber stocks that are used in tire manufacture must be processable and have a certain minimum level of tack and green strength. Processable stocks can be defined as having a Mooney viscosity of about 45 to 55. They can be calendered at about one meter per second in tire ply thicknesses, e.g., 1.27 mm±0.5 and provide a smooth, uniform surface. Tack is necessary so that the many components of a green tire will hold together until molding. This requires not only that the components exhibit quick stick when building, but also that the tack bonds have long term creep resistance, since the green tire may be hung on a rack several days before molding and vulcanization. In addition, an uncured tire must have good green strength so that it will not creep and hence distort excessively before molding or tear during the expansion that occurs upon molding, or in the second stage for a radial tire.

Styrene butadiene rubber (SBR) is widely used in tire components to take advantage of its cost, processability and physical properties, however, its drawbacks of poor tack and green strength require the addition of natural rubber. Natural rubber is blended with SBR because it imparts tack and green strength which thereby facilitates tire building.

Basically, green strength is a measure of unvulcanized stress/strain properties of rubber which are generally portrayed by stress/strain curves that can be related to the ability of an elastomer to withstand breaking upon being stretched or elongated. The inventor has explained in related work, published elsewhere, that natural rubber has greater green strength than SBR due to its ability to strain-harden through crystallization upon high deformation. The strain crystallization of natural rubber provides a strengthening mechanism that is absent in SBR. Specifically, the SBR green strength mechanism is through chain entanglement which results in an initially high tensile modulus upon elongation but which quickly necks down and breaks.

BACKGROUND OF THE INVENTION

As explained hereinabove, it is desirable to have a compound of SBR or other diene-containing synthetic rubbers with high green strength and good building tack. Through the years, increasing the green strength of SBR has been attempted by increasing molecular weight, partial crosslinking, modifying the polymer structure and the addition of other polymers.

Regarding the addition of other polymers, U.S. Pat. No. 3,798,190 discloses rubber compositions of high green strength comprising blends of styrene-butadiene rubber, with or without natural rubber, and a hydrogenated random copolymer of styrene-butadiene.

A recent U.S. Pat. No. 4,254,013 discloses an attempt to improve the green strength of elastomeric blends by the addition of an unsaturated acid to the synthetic component of a natural or synthetic cis-1,4-polyisoprene and synthetic elastomer composition whereby the green strength is increased by the formation of ionic bonds. Despite the improvement of green strength by the addition of the unsaturated acid, the patent still recommends a range of 50 to about 90 parts of natural rubber for those blends which exhibit improved green strength.

The preparation of a synthetic diene-containing rubber having improved green strength has been set forth in copending Ser. No. 132,736, commonly owned by the assignee of record herein. There, it has been disclosed that a terpolymer comprising styrene and butadiene, or similar monomers, and an N-(alkoxymethyl)acrylamide exhibits improved green strength over conventional SBRs.

Prior art considered during prosecution of the aforementioned patent application such as U.S. Pat. No. 3,037,963 disclosed the preparation of aldehyde-modified carboxylic acid amide resinous materials comprising in specific instances, styrene, butadiene and N-(alkoxymethyl)acrylamide. The materials were said to be useful as coating compositions.

Thus, the art considered herein has not provided a blend of natural and synthetic rubbers, having the green strength, building tack and processability of natural rubber. Merely by substituting various synthetic rubbers to reduce the natural rubber content to about 30 percent by weight, based upon the total weight of the rubber, it has not been possible to provide rubber compounds suitable for building tires.

DISCLOSURE OF INVENTION

In general, the subject invention is directed toward a blend of natural and synthetic rubber, having processability and improved green strength and building tack. The blend comprises from about 5 to 55 parts by weight of natural rubber, from about 30 to 50 parts by weight of a conjugated diene-containing synthetic rubber and, from about 5 to 50 parts by weight of a substituted acrylamide-containing synthetic rubber.

The blend of the present invention is useful as a rubber stock for tire carcasses where high green strength and good building tack are necessary. Such rubber stocks should also be easily processable and relatively stable. The improvements in the natural/synthetic rubber blend of the present invention are primarily attributable to the second synthetic rubber component. The composition thereof includes a conjugated diene monomer, a copolymerizable monomer containing a vinyl group and an N-(alkoxymethyl)acrylamide monomer.

BRIEF DESCRIPTION OF THE DRAWINGS

FIGS. 1 and 2 present various stress-strain curves for rubber blends of the present invention and for comparison, a conventional rubber blend of SBR and natural rubber.

PREFERRED MODE FOR CARRYING OUT THE INVENTION

The natural/synthetic rubber blend of the present invention contains from about 5 to 55 parts by weight of natural rubber, with 30 parts being preferred. A second component of the blend is a conjugated diene-containing synthetic rubber in an amount of from about 30 to 50 parts by weight, with 40 parts being preferred. The aforesaid synthetic rubber comprises homopolymers of conjugated dienes having from about four to 20 carbon atoms, with 1,3-polybutadiene or isoprene being preferred, and copolymers thereof with plastic-forming monomers containing a vinyl group.

Suitable vinyl monomers include monovinyl aromatic compounds, having from eight to about 20 carbon atoms and optionally one or more halogen substituents, and acrylic compounds having from three to about five carbon atoms. Examples of the monovinyl aromatics include styrene and α-methylstyrene, and examples of the acrylic monomers include methyl methacrylate and acrylonitrile. Most suitable as the synthetic rubber component is polybutadiene, styrene-butadiene rubber (SBR) or acrylonitrile-butadiene copolymer (nitrile rubber). Average molecular weight ($\overline{M}w$) of the synthetic rubber ranges from about $50 \times 10^3$ to $800 \times 10^3$ with $400 \times 10^3$ being preferred.

The third and last component of the blend comprises a second synthetic rubber, differing from the first, in that it also contains an N-(alkoxymethyl)acrylamide monomer. More specifically, the second synthetic rubber, sometimes referred to herein as the substituted acrylamide-containing rubber, comprises a conjugated diene monomer as described hereinabove; optionally a copolymerizable monomer containing a vinyl group, as described hereinabove; and an N-(alkoxymethyl)acrylamide monomer having the formula

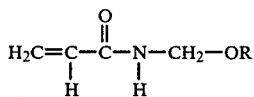

wherein R is a straight or branched alkyl chain having from 1 to about 20 carbon atoms with 3 to 8 carbon atoms being preferred. One particularly useful acrylamide employed for the work reported herein is N-(isobutoxymethyl)acrylamide (hereinafter IBMA) the R group being isobutyl. The amount of substituted acrylamide-containing synthetic rubber ranges from about 5 to 50 parts by weight, with 30 parts being preferred.

The composition of the substituted acrylamide-containing rubber includes from about 60 to 99.7 percent by weight of the conjugated diene monomer; from about 0 to 39.7 percent by weight of the monomer containing a vinyl group and, from about 0.3 to about 10 percent by weight of the N-(alkoxymethyl)acrylamide. Average molecular weight ($\overline{M}w$) of the substituted acrylamide-containing rubber is from about $50 \times 10^3$ to $500 \times 10^3$ with $200 \times 10^3$ being preferred.

Amounts of the three rubber components employed in the blend are based upon the following relationship:

$$C + A \geq B$$

$$A + B \geq C$$

where A is natural rubber; B is SBR or other conjugated diene-containing rubber and C is IBMA. Natural rubber has the three desired properties while SBR and IBMA have only processability and high green strength, respectively. By the proper combination of the two synthetic rubbers with natural rubber, the amount of natural rubber employed can be significantly reduced to the point of constituting only a minor component of the blend.

Preparation of the copolymer is via emulsion polymerization with an emulsifier such as sodium lauryl sulfate. A water soluble initiator is employed such as diisopropylbenzene hydroperoxide and, a molecular weight modifier, n-dodecyl mercaptan, can be added. An activator such as tetraethylenepentamine is added to the reaction vessel immediately after the diene monomer is charged.

Other emulsifiers suitable for the present invention include long chain metal sulfonates, rosin acid and fatty acid salts. Amounts added range from about two parts per hundred of monomer (phm) to about five phm. Initiators suitable for the present invention other than diisopropylbenzene hydroperoxide include other free radical types such as peroxides and peroxydicarbonates, benzoyl peroxide, cumene hydroperoxide and tert-butyl peroxide, and the amount employed ranges from about 0.1 phm to about 0.6 phm depending upon the desired molecular weight of the polymer product. Similarly, the activators can include $FeSO_4.7H_2O$, alkyl amines having primary and secondary amines and sodium formaldehyde sulfoxylate in an amount of from about 0.1 phm to 0.6 phm. Other molecular weight modifiers suitable for this invention include tertiary alkyl mercaptans which are employed in amounts of from about 0.1 phm to about 0.3 phm. Antioxidants can also be employed such as di-tert-butyl para-cresol (DBPC) and Santoflex which are added to the polymer latex in amounts of from about 0.1 to about 1.0 percent by weight of the solid polymer.

It is to be understood that the method set forth herein is not the subject of the present invention which invention is not to be limited by the recitation of particular emulsifiers, initiators, activators or modifiers. All of these and others are well known to those skilled in the art of emulsion polymerization and therefore, the present invention does not encompass any selection of such components or polymerization techniques.

Synthesis generally involves the steps of charging a reaction vessel with water, detergent, a modifier if desired, the initiator, and the acrylamide and vinyl monomers; purging the vessel with an inert gas such as nitrogen; charging the diene monomer and activator to the vessel and polymerizing the monomers therein for a period of time of from about 12 to about 16 hours at a temperature of from about 0° C. to about 30° C. Following polymerization, the polymer product is obtained by coagulating or precipitating into isopropanol.

Coagulation can be conducted by any of the known techniques for coagulation of a polymer latex with an electrolyte such as by mixing the latex and electrolyte together at a temperature above the freezing temperature and below the boiling temperature of the latex, the amount of electrolyte employed varying with several factors such as the solids content of the latex, the particle size of the latex, the amount of emulsifying agent in the latex, the particular electrolyte used, and so forth. The latex and electrolyte are usually mixed by adding the latex to an aqueous solution of the electrolyte, adding the electrolyte, usually as a dilute aqueous solution, to the latex, or simultaneously feeding the latex and an aqueous solution of electrolyte to a mixing chamber. Temperatures of about 5° to 30° C. are preferred and agitation is normally continued throughout the coagulation. Among the electrolytes usually used for coagulation are alcohols or aqueous metal salt solutions.

Coagulation with alcohol or aqueous metal salt solutions will provide the solid polymer which is then washed and dried for subsequent usage such as compression or injection molding. While either system will coagulate the latex when metal salt solutions are selected, the latex blend also undergoes coordination which is believed to occur between the metal ions and the substituted acrylamides. Where alcohol is selected, coordination does not occur, however, upon heating, the polymer crosslinks through the substituted acrylamides.

The metal ions that coagulate the copolymer latex are all divalent, trivalent and polyvalent metal ions such as aluminum, barium, cadmium, calcium, chromium, cobalt, iron, magnesium, manganese, nickel, tin, zinc and the like which are supplied as metal salts having the formula $MX_n$ wherein M is one of the foregoing elements, X is an anion such as an organic carboxylate, halide, hydroxide, nitrate, sulfate, sulfonate and the like and n is from two to six. The amount of the metal salt employed is that amount which will provide at least one equivalent mole of the metal ion to two equivalent moles of IBMA bonded to the polymer latex in the final product.

In the experimental work set forth hereinbelow exemplifying the blend of the present invention, a substituted acrylamide-containing synthetic rubber was prepared which was thereafter blended in various amounts with natural and synthetic rubbers also in various amounts. Preparation of a substituted acrylamide rubber has been presented, with all parts being given on a weight percent basis based upon 100 parts of monomer. Subsequent preparation of the blend has been reported, presenting parts of each rubber component on a weight percent basis based upon 100 parts of the three rubber components, unless otherwise specified.

A typical synthesis of the acrylamide copolymer of the present invention was conducted as follows: A 295 ml bottle was charged with 100.00 g of water, 2.50 g of sodium lauryl sulfate, 0.20 g of diisopropylbenzene hydroperoxide, 0.05 g of n-dodecyl mercaptan, 10.00 g of styrene and 2.00 g of N-(isobutoxymethyl)acrylamide. The bottle was sealed with a rubber lined, three-hole crown cap and was purged with nitrogen for 15 minutes. 36.00 g of butadiene was charged followed by 0.15 g of tetraethylenepentamine. The polymerization was conducted at 5° C. for 13 hours. At the end of this time, a 60% conversion of polymer latex was obtained from the bottle after precipitating with isopropanol.

Other rubbers were prepared following this same synthesis. The amount of IBMA and styrene content for seven such polymers is presented in Table I. Amount of water was approximately 200 percent, based upon the total weight of the monomer charge.

TABLE I

| Ex. No. | IBMA-Containing SBR | |
|---|---|---|
| | IBMA Wt % | Styrene Wt % |
| 1 | 2.24 | 12 |
| 2 | 1.12 | 21 |

TABLE I-continued

| Ex. No. | IBMA-Containing SBR | |
|---|---|---|
| | IBMA Wt % | Styrene Wt % |
| 3 | 1.79 | 12 |
| 4 | 1.46 | 20 |
| 5 | 1.68 | 21 |
| 6 | 3.02 | 12 |
| 7 | 4.26 | 21[a] |

[a]High conversion

Following preparation of the substituted acrylamide-containing synthetic rubber, that is, the IBMA-containing SBRs, blends of examples 1–7 were each compounded with natural rubber and conventional SBRs. The amounts of the various rubbers are presented in Table II for Stocks 1–12. Stock 1 appears as a Control with no IBMA-containing SBR. Stocks 2–4 contain one type of IBMA rubber, example 7, in varying amounts as a substitute for equivalent amounts of natural rubber in Stock 1. Stocks 5–10 contain different IBMA rubbers, examples 4–6 and 1–3, respectively, again as a substitute for an equivalent amount of natural rubber in Stock 1, in a fixed amount. Lastly, for comparative purposes, Stocks 11 and 12 were prepared as controls comprising 30/70 blends of natural/SBR rubber without any IBMA rubber. For Stock 12, 30 parts of a second SBR were substituted for an equivalent amount of the SBR in Stock 11.

The properties of the natural rubber, Hartex 20, and the commercial SBRs, S1502 and HX567 employed in the blends are as follows: Hartex 102 is a low ammonia type of natural rubber latex containing 62.1±0.3 total solids. Percent ammonia is 0.15 to 0.23; mechanical stability at 55 percent is 1650±550 seconds; KOH number is 0.48 to 0.70; volume of fatty acid is 0.05; and pH is 9.6±0.3. S1502 is a commercially available SBR containing 23.5 percent bound styrene nonstaining polymer; having a Mooney viscosity (ML/4/100° C.) from 46 to 58 and a specific gravity of 0.94. HX567 is an oil extended copolymer of styrene and butadiene containing 20 parts of nonstaining oil; 30 percent bound styrene; having a Mooney viscosity (ML/4/100° C.) from 65 to 75 and a specific gravity of 0.94.

TABLE II

| | Stock Compositions | | | | | | | | | | | |
|---|---|---|---|---|---|---|---|---|---|---|---|---|
| | Stock Nos: | | | | | | | | | | | |
| Component | 1 | 2 | 3 | 4 | 5 | 6 | 7 | 8 | 9 | 10 | 11 | 12 |
| Hartex 20 | 60 | 40 | 30 | 20 | 30 | 30 | 30 | 30 | 30 | 30 | 30 | 30 |
| S1502 | 40 | 40 | 40 | 40 | 40 | 40 | 40 | 40 | 40 | 40 | 70 | 40 |
| HX567 | — | — | — | — | — | — | — | — | — | — | — | 36[a] |
| Ex. 7 | — | 20 | 30 | 40 | — | — | — | — | — | — | — | — |
| Ex. 4 | — | — | — | — | 30 | — | — | — | — | — | — | — |
| Ex. 5 | — | — | — | — | — | 30 | — | — | — | — | — | — |
| Ex. 6 | — | — | — | — | — | — | 30 | — | — | — | — | — |
| Ex. 1 | — | — | — | — | — | — | — | 30 | — | — | — | — |
| Ex. 2 | — | — | — | — | — | — | — | — | 30 | — | — | — |
| Ex. 3 | — | — | — | — | — | — | — | — | — | 30 | — | — |

[a]Contains processing oil, 30 parts of HX567 present

In addition to the rubber components listed in Table II, several ingredients conventionally employed in the compounding of rubber stocks, suitable for the manufacture of tires, were added as follows: To Stocks 1–12 were added 50 parts carbon black; 7.5 parts zinc oxide and 3.4 parts stearic acid. Stock 1 also contained 8.2 parts of an aliphatic resin and 2.2 parts of processing oil. Stocks 2–12 contained 8.0 parts of the aliphatic resin and 5.0 parts of a phenolic resin. Stocks 2–11 also contained 5.0 parts of processing oil. All amounts of the components are given in a parts per hundred rubber (phr) basis and it is to be understood that the components are disclosed only to provide one skilled in the art at least one typical rubber stock with which to work. The specific formulation is, therefore, not deemed to be part of the present invention which is the blend of the three rubbers disclosed.

Stocks were mixed in a laboratory Brabender after first premixing the natural rubber and substituted acrylamide rubber in an effort to cause them to form a co-continuous phase in the finished blend. All stocks milled smoothly without melt fracture. Properties, obtained using standard laboratory procedures, are presented in Table III and FIGS. 1 and 2. Compared to the control, Stock 1, all stocks exhibited about the same scorch time and maximum torque although cure time was slightly greater in all cases. Stocks 5–10 in particular had good Mooney viscosities, indicative of processability. All stocks of the present invention, viz, 2–10 exhibited good tensile strengths and elongations, several exceeding the values reported for Stock 1. With respect to tack, Stocks 4–10 were significantly better than the control, Stock 1.

11 and 12 in which 30 phr of S1502 or HX567 respectively, were substituted for an equivalent amount of natural rubber in Stock 1. These two stocks were found to neck down and break at short elongation when tested. As noted hereinabove, wind-up tack values (Table III) were excellent for several of the stocks containing the various IBMA-containing SBR. Blends of this type thus show excellent promise with respect to tack and green strength for replacing Stock 1.

As the foregoing data demonstrates, the substitution of a portion of the natural rubber in a natural rubber/SBR blend with a substituted acrylamide-containing synthetic rubber provides a useful blend exhibiting processability as well as good green strength and good building tack. The blends of the present invention also mill smoothly without melt fracture. It has previously been customary to employ at least 50 phr of natural rubber in a blend with a diene-containing synthetic rubber to provide sufficient building tack and green strength for tire carcasses. Therefore, reducing the amount of natural rubber to only 30 phr provides a significant cost savings when the 30 parts substituted are of a less costly synthetic rubber.

While 60/40 blends of natural/synthetic rubber are

TABLE III

| Stock Nos: | Stock Properties (Brabender Mix) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Monsanto Rheometer 149° C. | | | | | | | | | | | | |
| TS[a] | 9.6 | 10.2 | 8.6 | 9.6 | 9.2 | 8.9 | 8.9 | 8.4 | 8.9 | 9.0 | 9.9 | 9.8 |
| TC[b] | 22.7 | 29.3 | 26.0 | 27.4 | 26.6 | 26.0 | 25.8 | 25.3 | 25.4 | 24.6 | 33.4 | 27.6 |
| IP[c] | 48.9 | 39.8 | 43.0 | 42.2 | 46.6 | 47.8 | 49.9 | 49.0 | 48.1 | 47.9 | 43.8 | 45.0 |
| Ring Tensile Stress (MPa) | | | | | | | | | | | | |
| 50% | 1.92 | 1.43 | 1.52 | 1.93 | 1.49 | 1.55 | 1.74 | 1.64 | 1.56 | 1.71 | 1.67 | 1.77 |
| 100% | 3.74 | 2.57 | 2.76 | 3.41 | 2.92 | 3.07 | 3.45 | 3.18 | 3.10 | 3.41 | 3.12 | 3.29 |
| 300% | 18.0 | 11.3 | 12.4 | 15.1 | 14.2 | 14.8 | 15.5 | 14.6 | 14.6 | 15.7 | 13.4 | 13.7 |
| Brk | 22.2 | 18.0 | 18.3 | 25.5 | 19.5 | 20.8 | 19.1 | 19.8 | 20.4 | 22.0 | 20.3 | 18.9 |
| Break Elongation | 353 | 418 | 400 | 447 | 380 | 386 | 351 | 378 | 383 | 387 | 411 | 388 |
| Energy to Break | | | | | | | | | | | | |
| (MJ/m$^3$) | 32.5 | 30.5 | 30.2 | 47.6 | 30.2 | 32.6 | 28.1 | 30.8 | 31.5 | 34.8 | 35.9 | 32.0 |
| ML/4/100° | 22 | | | | 42.5 | 51.0 | 53.5 | 56.9 | 50.0 | 55.0 | 26.0 | 31.0 |
| Wind up Tack gms/cm | 446.4 | 446.4 | 482.2 | 678.6 | 1160.8 | 607.2 | 1071.5 | 1071.5 | 946.5 | 1428.6 | 303.6 | 232.2 |

[a]Scorch time in minutes
[b]Time cure at 90% cure
[c]Maximum torque

With respect to the graphs, FIG. 1 compares the green stress-strain curves of Stock 1 and Stocks 2–4. After the standard Brabender mix conditions, Stock 1 did not exhibit an upturn in its green stress-strain curve. It is believed that mix conditions were sufficiently severe to cause drastic chain scission of the natural rubber and hence decrease green strength. This is also shown by the low Mooney viscosity (ML/4/100° C.=22) of this stock. Lab Banbury-mixed Stock 1 exhibited a Mooney in the range of 45–50 with a corresponding improvement in green strength (FIG. 2). FIG. 1 also shows that the higher the level of IBMA-containing SBR the greater the green strength. Referring back to Table III, it can be seen that wind-up tack values were similar for Stock 1 and Stocks 2–4. Again, the Brabender-mixed Stock 1 had low tack compared to Banbury-mixed Stock 1 because of the poor green strength of the former. Thus, green strength has been improved without loss of tack.

The green strength of Stocks 5–10 is depicted in FIG. 2. All the stocks containing 30 phr of the various IBMA-containing SBR exhibited an upturn in their green stress-strain response. This is in sharp contrast to Stocks useful for building tire carcasses and a blend of 30/40/30 natural/diene-containing synthetic/substituted acrylamide-containing synthetic is comparable, the blends of the present invention should not be so limited. Similarly, the diene-containing synthetic rubber SBR, and substituted acrylamide rubber disclosed, a terpolymer of IBMA and SBR, have been provided herein merely for purposes of exemplification and to demonstrate operability and, therefore, the selection of specific synthetic rubbers can be determined without departing from the spirit of the invention herein disclosed and described. Moreover, the scope of the invention shall include all modifications and variations that may fall within the scope of the attached claims.

I claim:

1. A blend of natural and synthetic rubbers having processability and improved green strength and tack, said blend comprising:
   from about 5 to 55 parts by weight of natural rubber;
   from about 30 to 50 parts by weight of a conjugated diene-containing synthetic rubber having an average molecular weight of from about $50 \times 10^3$ to about $800 \times 10^3$; and from about 5 to 50 parts by weight of a substituted acrylamide-containing synthetic rubber having an average molecular weight of from about $50 \times 10^3$ to about $500 \times 10^3$;

wherein said conjugated diene-containing synthetic rubber is selected from the group consisting of conjugated diene homopolymers and copolymers, prepared from conjugated diene monomers having from four to about 12 carbon atoms, with monomers containing a vinyl group selected from the group consisting of monovinyl aromatic compounds having from eight to about 20 carbon atoms and acrylic compounds having from three to about five carbon atoms including halogen-substituted compounds;

said substituted acrylamide-containing synthetic rubber comprises from about 60 to 99.7 percent by weight of said conjugated diene monomer;

from about 0 to 39.7 percent by weight of said monomer containing a vinyl group and copolymerizable with said conjugated diene monomer; and from about 0.3 to 10 percent by weight of an N-(alkoxymethyl)acrylamide monomer having the formula

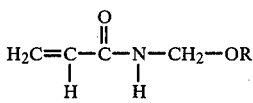

wherein R is a straight or branched alkyl chain having from 1 to about 20 carbon atoms, the weight of each said monomer component being based upon the total weight of said substituted acrylamide-containing synthetic rubber; and wherein said blend is based upon the following relationship:

$A + B \geqq C$ $C + A \geqq B$ wherein A is equal to the parts by weight of said natural rubber, B is equal to the parts by weight of said conjugated diene-containing synthetic rubber, and C is equal to the parts by weight of said substituted acrylamide-containing synthetic rubber.

2. A blend, as set forth in claim 1, wherein said conjugated diene monomer is 1,3-butadiene, said monomer containing a vinyl group is styrene and said conjugated diene-containing rubber is styrene-butadiene rubber.

3. A blend, as set forth in claim 1, comprising:
30 parts of natural rubber;
40 parts of styrene-butadiene rubber; and
30 parts of an N-(isobutoxymethyl)acrylamide-containing styrene-butadiene rubber.

* * * * *